(12) United States Patent
Takahashi

(10) Patent No.: US 7,736,586 B2
(45) Date of Patent: Jun. 15, 2010

(54) MELTING FURNACE WITH AGITATOR

(76) Inventor: Kenzo Takahashi, 149, Rokkodai 9-Chome, Matsudo-Shi, Chiba-Ken (JP)

( * ) Notice: Subject to any disclaimer, the term of this patent is extended or adjusted under 35 U.S.C. 154(b) by 0 days.

(21) Appl. No.: 12/370,220

(22) Filed: Feb. 12, 2009

(65) Prior Publication Data
US 2009/0322000 A1     Dec. 31, 2009

(30) Foreign Application Priority Data
Jun. 27, 2008     (JP) .............................. 2008-169293

(51) Int. Cl.
*H05B 6/32*     (2006.01)
*F27D 27/00*    (2010.01)
*H05B 6/54*     (2006.01)
*C21C 7/00*     (2006.01)

(52) U.S. Cl. ................. 266/234; 266/233; 373/116; 373/146; 75/10.13; 75/10.14; 75/10.15; 75/10.16; 75/10.67

(58) Field of Classification Search ............. 266/200, 266/233–234, 34, 236, 237; 373/116, 146; 75/10.13, 10.14, 10.15, 10.16, 10.67
See application file for complete search history.

(56) References Cited
U.S. PATENT DOCUMENTS
2006/0001200 A1 *  1/2006  Takahashi ............... 266/234
2009/0020925 A1 *  1/2009  Takahashi ............... 266/234

FOREIGN PATENT DOCUMENTS
WO     WO 2008/010285     *  1/2008

* cited by examiner

*Primary Examiner*—Roy King
*Assistant Examiner*—Lois Zheng
(74) *Attorney, Agent, or Firm*—Winston & Strawn LLP

(57) ABSTRACT

There is provided a melting furnace with an agitator. The melting furnace with an agitator includes a melting furnace that contains melt, and an agitator that agitates the melt by an electromagnetic force. The agitator includes a first electrode that is provided at an arbitrary position of the melting furnace so as to come in contact with the melt contained in the melting furnace, a second electrode that is provided near a bottom wall of the melting furnace so as to come in contact with the melt, a first magnetic field device that is provided outside the melting furnace so as to face the bottom wall of the melting furnace and makes a north pole face the bottom wall, and a second magnetic field device that is provided outside the melting furnace so as to face the bottom wall of the melting furnace and makes a south pole face the bottom wall. The first and second magnetic field devices are disposed with a gap in a certain direction.

12 Claims, 6 Drawing Sheets

MELTING FURNACE WITH AGITATOR

CROSS-REFERENCE TO PRIOR APPLICATION

This application claims priority to Japanese Application No. 2008-169293, filed Jun. 27, 2008, the disclosure of each of which is incorporated herein by express reference thereto.

BACKGROUND OF THE INVENTION

1. Field of the Invention

The present invention relates to a melting furnace with an agitator.

2. Background Art

In an automotive industry, an electric industry, and a building-products industry, aluminum has been widely used to make products in recent years. In each industry, strenuous efforts have been made to obtain an aluminum melt having uniform composition during the manufacture of products. In general, three main kinds of means have been used to achieve this object at present.

First means is electromagnet type stirrer. In this technique, commercial power is used as energy for generating a magnetic field that is required for moving an aluminum melt. In this technique, there are shortcomings in that a ratio where power is converted into heat during the generation of the magnetic field is large, high power consumption is required, and it is difficult to perform maintenance.

Second means is mechanical agitation. This is relatively inexpensive, but there is a shortcoming in that running cost is large.

Third means is vacuum pumping. This requires meticulous attention in operation, and is limited to small performance.

SUMMARY OF THE INVENTION

The present invention has been made in consideration of the above to make up for the shortcomings in the related art, and provides a melting furnace that is easily handled, has has simple structure, is able to be produced inexpensively and is able to be produced as both a small-sized furnace and a large-sized furnace.

According to an aspect of the present invention, a melting furnace with an agitator includes a melting furnace that contains a melt, and an agitator that agitates the melt by an electromagnetic force. The agitator includes a first electrode that is provided at an arbitrary position of the melting furnace so as to come in contact with the melt contained in the melting furnace, a second electrode that is provided near a bottom wall of the melting furnace so as to come in contact with the melt, a first magnetic field device that is provided outside the melting furnace so as to face the bottom wall of the melting furnace and makes a north pole face the bottom wall, and a second magnetic field device that is provided outside the melting furnace so as to face the bottom wall of the melting furnace and makes a south pole face the bottom wall. The first and second magnetic field devices are disposed with a gap in a certain direction.

According to the present invention, it is possible to provide a melting furnace that is easily handled, has simple structure, is able to be produced inexpensively and is able to be produced as both a small-sized furnace and a large-sized furnace.

DESCRIPTION OF THE EMBODIMENTS

The principle of the present invention will be described previously to the description of an embodiment of the present invention.

In the present invention, two magnetic field devices are used and an aluminum melt or the like is driven straight by a resultant force of electromagnetic forces of the magnetic field devices.

First, the drive principle using one magnet will be described.

Figure 1:
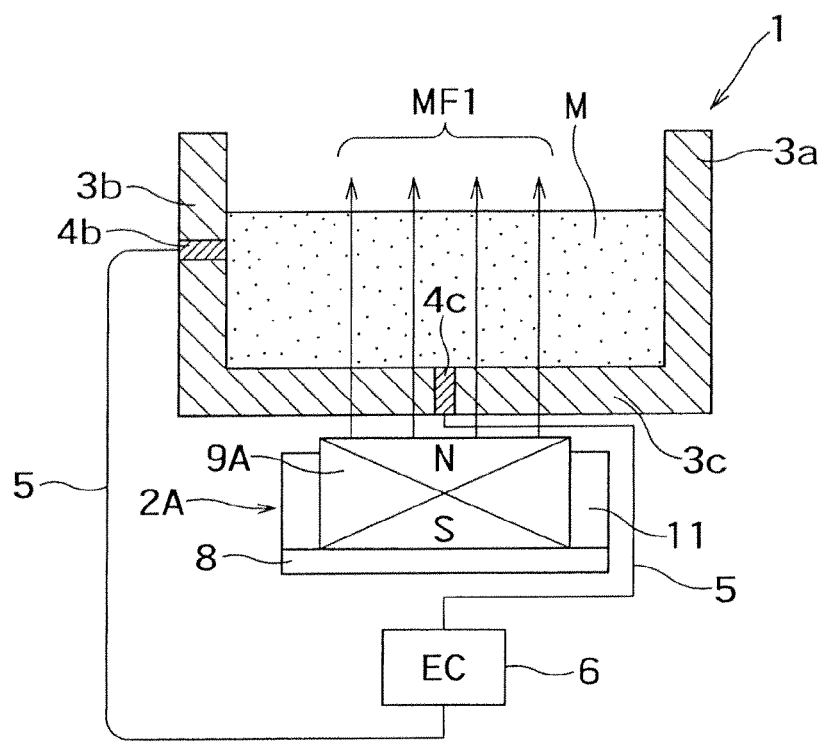
FIG. 1 is an explanatory longitudinal sectional view of an apparatus that is used to describe the principle of the present invention.
Figure 2:
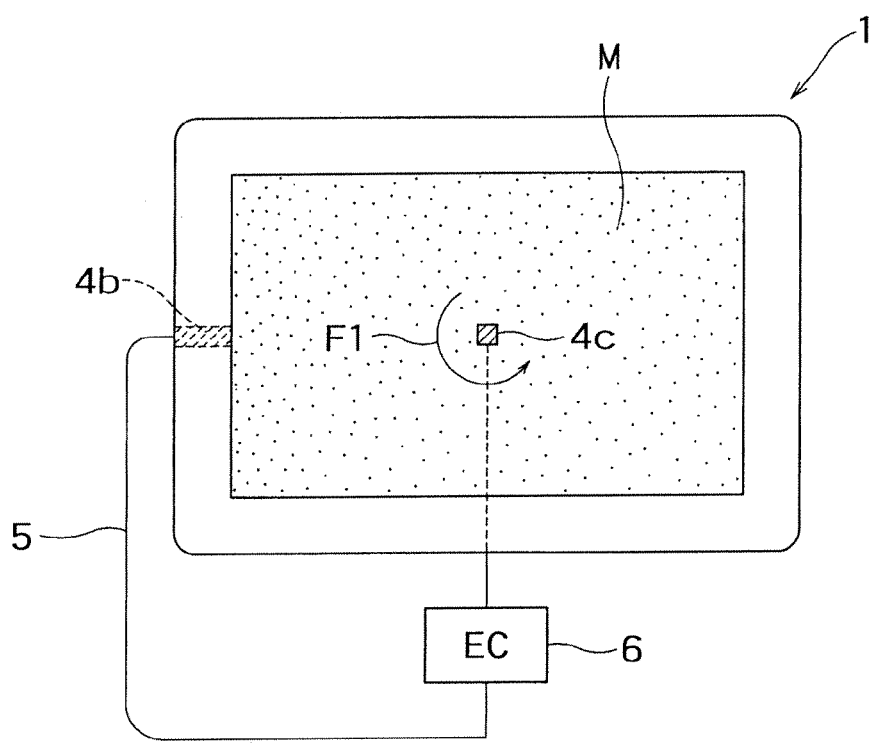
FIG. 2 is an explanatory plan view of the apparatus.

An apparatus shown in FIGS. 1 and 2 is used to rotate a melt M in a direction of a flow F1 shown in FIG. 2. FIG. 1 is a longitudinal sectional view of the apparatus, and FIG. 2 is a plan view thereof.

In FIG. 1, reference numeral 1 denotes a melting furnace, and reference numeral 2A denotes an agitator. An electrode 4b is provided in a sidewall 3b of sidewalls 3a and 3b of a furnace main body 3 of a melting furnace 1, and an electrode 4c is also provided in a bottom wall 3c. These electrodes 4b and 4c are connected to a power supply (power supply control panel EC) 6 by cables 5. The agitator 2A includes a magnetic field device (permanent magnet) 9A that is provided on a yoke 8. The permanent magnet 9A is disposed so that a north pole thereof is positioned on the upper side and a south pole thereof is positioned on the lower side in FIG. 1. The permanent magnet 9A is surrounded by a stainless case 11. A plan view corresponding to FIG. 1 is shown in FIG. 2.

In this apparatus, a magnetic field MF1 generated by the magnetic field device (permanent magnet) 9A faces the upper side of FIG. 1 as appreciated from FIG. 1. At the same time, a current flows between a pair of electrodes 4b and 4c through a conductive melt M. Accordingly, an electromagnetic force is generated in accordance with Fleming's left hand rule, and the melt M is pressed to move toward the outside of the magnetic field by the electromagnetic force. Therefore, the melt M is agitated in a rotatable state as shown by the flow F1 of the melt shown in FIG. 2. That is, it is found that the aluminum melt M is rotated around the electrode 4c in a concentric fashion.

Figure 3:
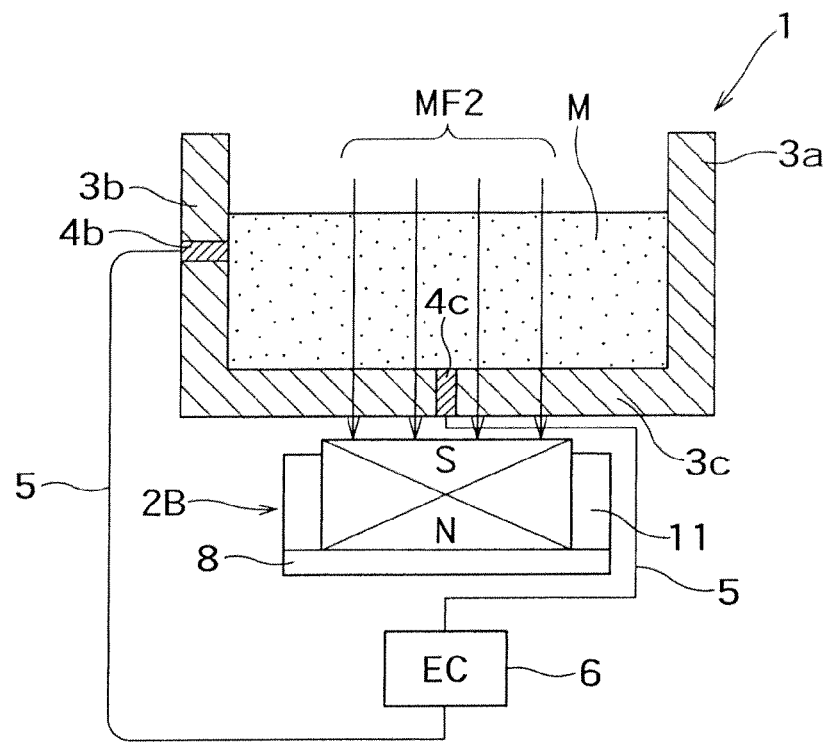
FIG. 3 is an explanatory longitudinal sectional view of another apparatus that is used to describe the principle of the present invention.
Figure 4:
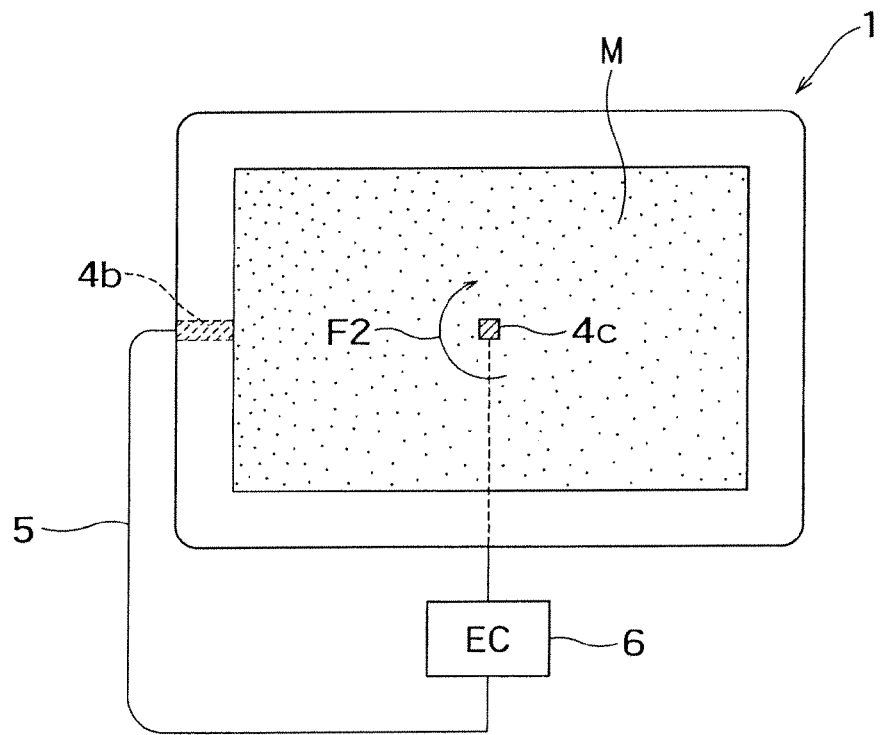
FIG. 4 is an explanatory plan view of the another apparatus.

In contrast, an apparatus shown in FIGS. 3 and 4 is used to rotate a melt M in a direction of a flow F2 shown in FIG. 4. Likewise, FIG. 3 is a longitudinal sectional view of the apparatus, and FIG. 4 is a plan view thereof.

An apparatus shown in FIGS. 3 and 4 is different from that of the apparatus shown in FIGS. 1 and 2 in that a magnetic field device 9B of an agitator 2B is turned upside down with respect to that shown in FIGS. 3 and 4, that is, a south pole is positioned on the upper side and a north pole is positioned on the lower side and a magnetic field MF2 faces the lower side. Accordingly, the melt M is rotated in the direction of the flow F2 as shown in FIG. 4.

As described above, the direction of the flow F1 in the apparatus shown in FIGS. 1 and 2 is opposite to that of the flow F2 in the apparatus shown in FIGS. 3 and 4.

In the present invention, the above-mentioned two kinds of devices are used and the melt M is driven straight by a resultant force of the electromagnetic forces of the magnetic field devices.

Figure 5:
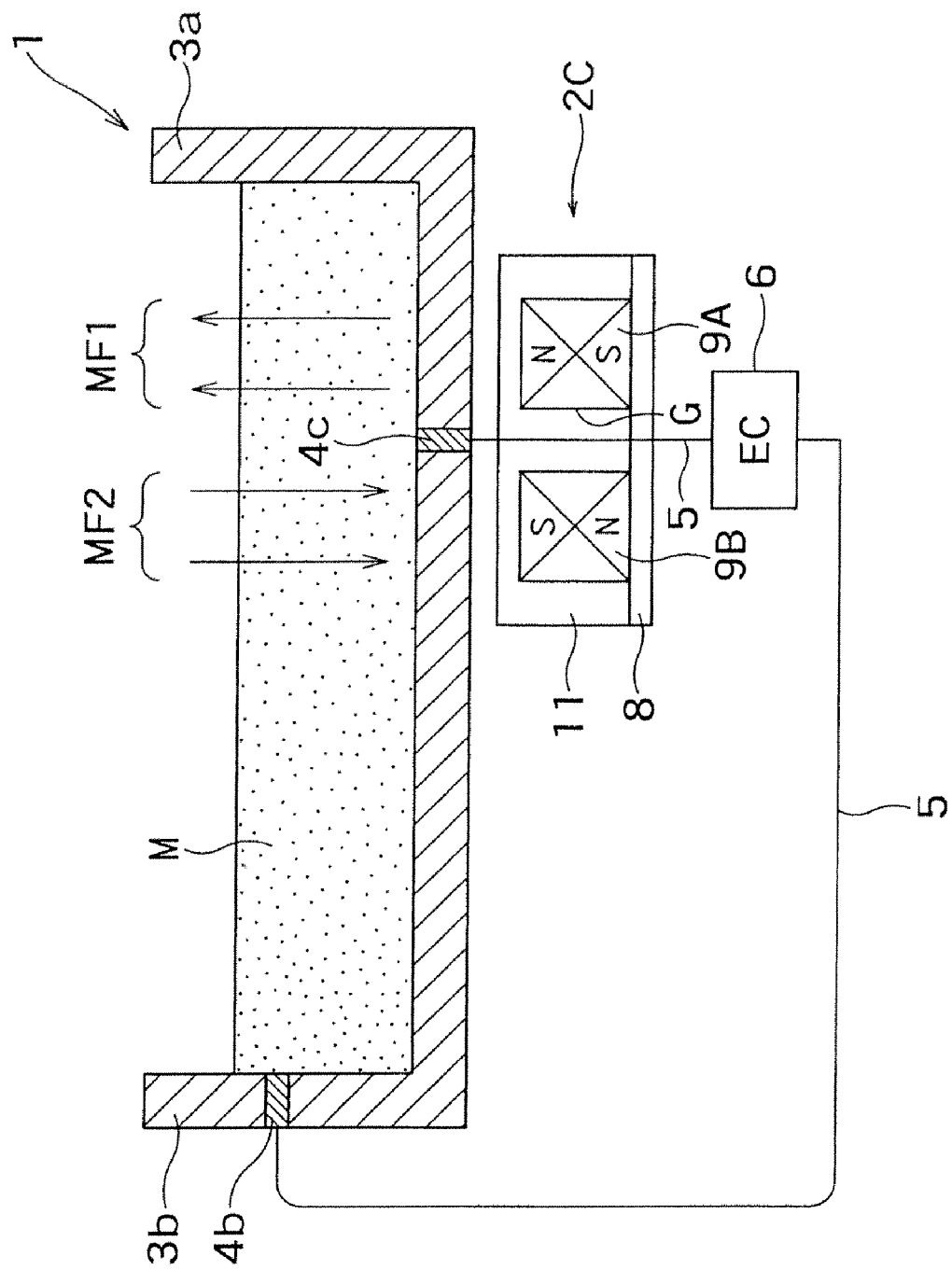
FIG. 5 is an explanatory longitudinal sectional view of an apparatus according to an embodiment of the present invention.
Figure 6:
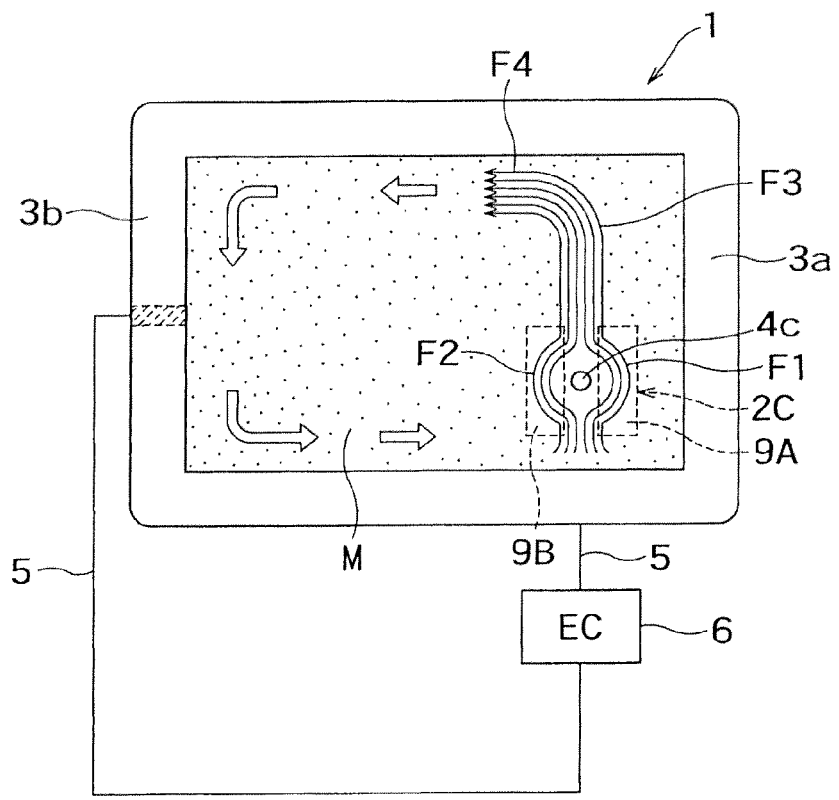
FIG. 6 is an explanatory plan view of the apparatus.

FIG. 5 shows a melting furnace with an agitator according to an embodiment of the present invention. The flow of the melt M, which is generated by this apparatus shown in FIG. 5, is shown in FIG. 6. That is, a linear flow F3 is generated through the composition of the flows F1 and F2.

That is, the magnetic field devices 9A and 9B are disposed with a gap G that is a certain distance, and an electromagnetic force is not generated between the magnetic field devices 9A and 9B. Accordingly, the flows F1 and F2 of an aluminum melt of which the directions (movement direction) are opposite to each other collide with each other at a position that corresponds to the groove-shaped gap G between the magnetic field devices 9A and 9B. As a result, as shown in FIG. 6, the aluminum melt M flows out by the flow F3 along a longitudinal direction (a direction parallel to the north and south poles) between the magnetic field devices 9A and 9B. After that, the aluminum melt M flows counterclockwise in the melting furnace 1 as a flow F4.

Figure 7:
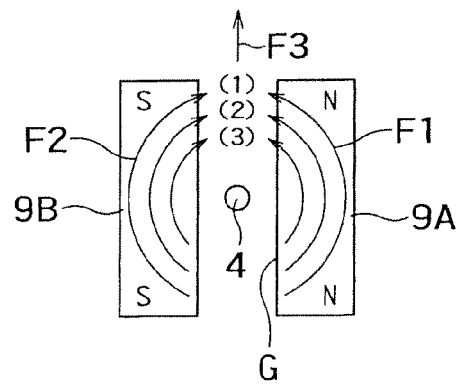
FIG. 7 is an explanatory view illustrating the operation of the apparatus according to the embodiment.
Figure 8:
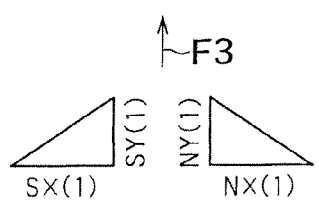
FIG. 8 is a view illustrating an electromagnetic force in the apparatus according to the embodiment.

Details are shown in FIG. 7 that shows the flows F1 and F2 and FIG. 8 that is a view illustrating a force to be applied. That is, FIG. 8 is a view illustrating the state of a force near a position (1) of FIG. 7.

If a counterclockwise electromagnetic force is applied to the aluminum melt M above the magnetic field device 9A and a clockwise electromagnetic force is applied to the aluminum melt above the magnetic field device 9B as shown in FIGS. 5 and 6, the aluminum melt M collide at positions (1), (2), (3) . . . between the magnetic field devices 9A and 9B of FIG. 7. As shown in FIG. 8, an electromagnetic force, which is applied to the aluminum melt M at the collision position (1) as described above, is decomposed in X and Y axis directions. First, as for the X axis direction, Sx(1) and Nx(1) have opposite directions and the same magnitude, thereby being offset to each other. This is the same even at the points (2), (3), and (4) . . . . As for the Y axis direction, Sy(1) and Ny(1) generate component forces upward (in the same direction). Accordingly, the Y-axial electromagnetic force becomes a resultant force Sy(1)+Ny(1). This is the same even at the other points. As a result, only the Y-axial electromagnetic force functions as energy for moving the aluminum melt M, so that the aluminum melt M is linearly moved in a direction (F3) parallel to the north and south poles. This is the same even at the other points (2) and (3). It is obvious that the movement direction of the aluminum melt M may be changed if the directions of the magnetic field devices 9A and 9B in plan view are changed (skewed).

With being focused on this, the magnetic field devices 9A and 9B (agitator 2C) is formed to be rotated around a substantially vertical axis with respect to the melting furnace 1.

In addition, the magnetic field devices 9A and 9B are provided in the stainless case 11 so as to approach and be separated from each other and adjust the width of the gap G. The gap G between the magnetic field devices 9A and 9B can be adjusted as described above, so that it is possible to improve the efficiency of the agitator by a more appropriate distance.

Meanwhile, if the gap G between the pair of magnetic field devices 9A and 9B is set to be larger at an outlet of the flow of the melt M than an inlet thereof (if the lower portion of the gap in FIG. 7 is narrow and the upper portion thereof is wide, that is, the gap is formed in a tapered shape), the X-axial component force is decreased, so that more efficient results can be expected. Further, when the aluminum melt M begins to continuously flow, the Y axial component force is increased by the inertial force of the aluminum melt M. Accordingly, the flow state is significantly improved as compared to the beginning of the operation.

Figure 9:
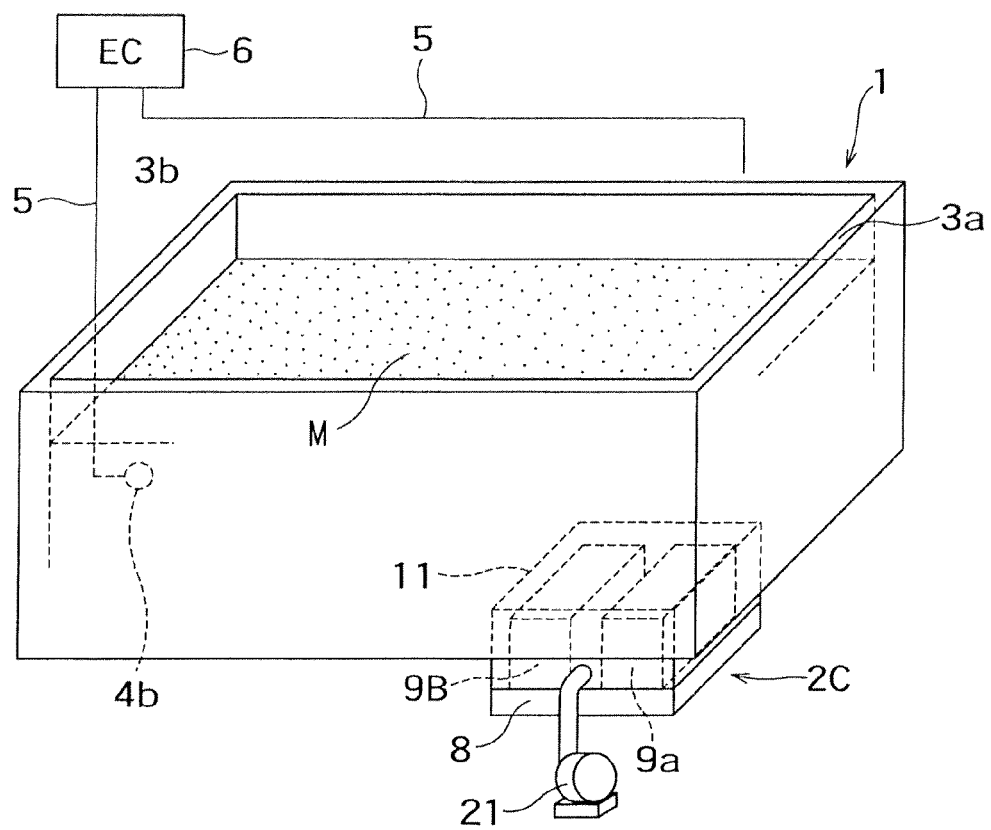
FIG. 9 is an explanatory perspective view of an apparatus according to another embodiment of the present invention.

FIG. 9 shows a melting furnace with an agitator according to another embodiment of the present invention.

The apparatus shown in FIG. 9 is substantially the same as the apparatus shown in FIGS. 5 and 6. The apparatuses are different from each other in terms of the dimension and shape of components and the positional relationship between the components and so on, and others are substantially the same. Accordingly, the same reference numerals are given to equivalent components, and the equivalent components will be described in brief.

Figure 10:
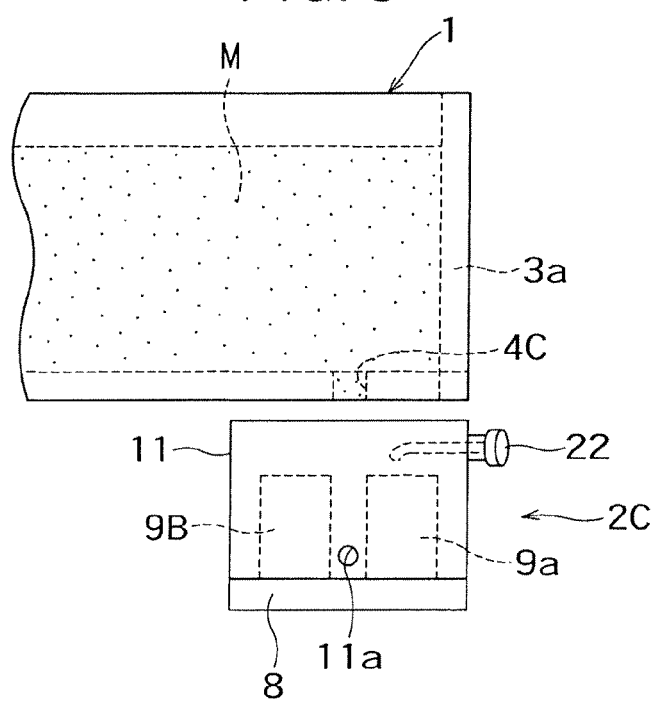
FIG. 10 is a partial front view of the apparatus.

That is, an agitator 2C is disposed outside and below the furnace bottom of a melting furnace 1. An electrode 4c is embedded in the melting furnace at the substantially center of the position, which corresponds to a gap G between magnetic field devices 9A and 9B of the agitator 2C, so as to come in contact with the aluminum melt M contained in the melting furnace 1. Further, another electrode 4b is disposed at an arbitrary position of a furnace wall of the melting furnace 1 (that may not be necessarily the furnace wall), and the electrodes 4b and 4c are connected to an external power supply control panel 6. Air may be sent to the magnetic field devices 9A and 9B from a blower 21 through an opening 11a of a stainless case 11 in order to prevent the damage that is caused by the radiant heat from the melting furnace 1. Further, a temperature sensor 22 used to measure temperature is provided to the stainless case. These are connected to the power supply control panel 6 and controlled (wiring is not shown). FIG. 10 is a partial front view of the apparatus shown in FIG. 9.

Since being substantially the same as the operation of the apparatus shown in FIGS. 5 and 6, the operation of the apparatus shown in FIGS. 9 and 10 will be described in brief.

If current is supplied to the melting furnace 1, which contains an aluminum melt M, from the power supply control panel 6 through cables 5, current flows in the aluminum melt (conductor) M between the electrodes 4b and 4c. In this case, an electromagnetic force is generated by the current, which flows in the aluminum melt M above the magnetic field devices 9A and 9B, in accordance with Fleming's rule. The direction of the electromagnetic force above the north pole is opposite to that above the south pole. Accordingly, the aluminum melt M, which is a conductor, is rotated counterclockwise above the magnetic field device 9A and rotated clockwise above the magnetic field device 9B in a semicircular shape as shown in FIG. 6. For this reason, as shown in FIG. 6, the aluminum melt M flows in a direction along the gap G that is formed between two magnetic field devices 9A and 9B. Therefore, the aluminum melt M finally flows counterclockwise in the melting furnace 1 as shown in FIG. 6. Here, as described above, it is possible to make the aluminum melt flow in an arbitrary direction by changing the directions of the magnetic field devices 9A and 9B.

As described above, according to the embodiment of the present invention, it is possible to rapidly melt an aluminum material and to obtain an aluminum melt having consistent quality.

Meanwhile, permanent magnets have been used as the magnetic field devices 9A and 9B in the above-mentioned embodiments. However, the present invention is not limited thereto, and electromagnets or the like may be used as the magnetic field devices.

Figure 11:
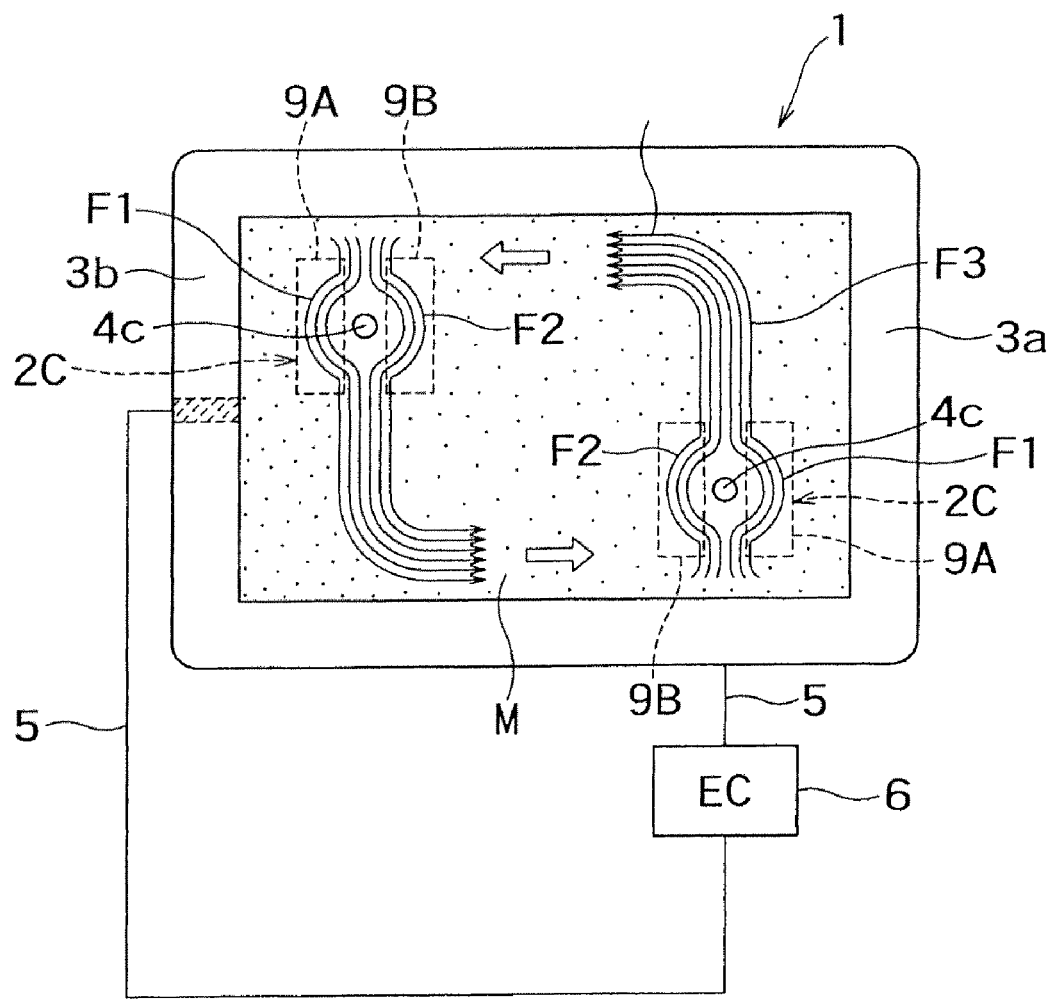
FIG. 11 is an explanatory plan view of an apparatus according to a still another embodiment of the present invention.

Further, one agitator has been used for an example in the above-mentioned embodiments, but a plurality of agitators may be provided along the flow of the aluminum melt. One example of this is shown in FIG. 11.

Since the agitator is provided outside the melting furnace in the embodiments of the present invention, it is possible to suppress the damage of the magnetic field devices 9A and 9B to the minimum extent.

The present inventor performed the following experiments in order to confirm the effects of the present invention.

That is, a test was performed in an experimental furnace (1/10 scale of real size). According to results of the test, it was possible to obtain the same results as a flow diagram shown in FIG. 6 as for the flow state of the aluminum melt. It was possible to obtain the flow velocity of the aluminum melt of 20 to 30 m/min at the bottom. If being changed to the amount of fed aluminum melt of a real furnace, the flow velocity corresponds to the range of 700 to 1000 Tons/Hr. This value corresponds to a large-sized electromagnet type agitator in the related art. In addition, the power consumption of the electromagnet type agitator is in the range of 200 to 300 KW, but the power consumption of the linear motion type melting furnace with an agitator according to the present invention is 1/20 thereof or less. The amount of generated $CO_2$ per year (12M, 20 D/M, and 12 Hr/D) of the electromagnet type agitator in the related art is 480 Tons/y. Meanwhile, the amount of generated $CO_2$ per year of the linear motion type melting furnace according to the present invention is 24 Tons/y. As described above, it is possible to significantly reduce not only power consumption but also the amount of generated $CO_2$.

What is claimed is:

1. A melting furnace with an agitator comprising:
a melting furnace, the melting furnace being arranged to be able to contain a melt; and
an agitator that agitates the melt by an electromagnetic force,
wherein the agitator includes a first electrode that is provided at an arbitrary position of the melting furnace so as to come in contact with the melt contained in the melting furnace, a second electrode that is provided near a bottom wall of the melting furnace so as to come in contact with the melt, a first magnetic field device that is provided outside the melting furnace so as to face the bottom wall of the melting furnace and makes a north pole face the bottom wall, and a second magnetic field device that is provided outside the melting furnace so as to face the bottom wall of the melting furnace and makes a south pole face the bottom wall, and
the first and second magnetic field devices are disposed with a gap in a certain direction,
the width of the gap is set so that a first flow of the melt and a second flow of the melt collide with each other at a position that corresponds to the groove-shaped gap between the first and second magnetic devices in order that the aluminum melt flows out by the flow along a longitudinal direction between the first and second magnetic field devices,
the first flow of the melt is caused by an electromagnetic force generated by both a current which flows between the first and second electrodes and magnetic force lines from the first magnetic field device, and
the second flow of the melt is caused by an electromagnetic force generated by both a current which flows between the first and second electrodes and magnetic force lines into the second magnetic field device.

2. The melting furnace with an agitator according to claim 1, wherein the first and second electrodes are embedded in a sidewall and the bottom wall of the melting furnace so as to be exposed to the interior space of the furnace.

3. The melting furnace with an agitator according to claim 1, wherein the agitator is rotatably provided around a substantially vertical axis so as to change a longitudinal direction of the gap with respect to the melting furnace.

4. The melting furnace with an agitator according to claim 1, wherein the first and second magnetic field devices of the agitator approach and are separated from each other so as to adjust the width of the gap.

5. The melting furnace with an agitator according to claim 1, wherein the first and second magnetic field devices are disposed so that the gap is formed in a tapered shape.

6. The melting furnace with an agitator according to claim 1, wherein a permanent magnet is used as each of the first and second magnetic field devices.

7. The melting furnace with an agitator according to claim 1, wherein an electromagnet is used as each of the first and second magnetic field devices.

8. The melting furnace with an agitator according to claim 1, further comprising:
a blower that cools the first and second magnetic field devices by air.

9. The melting furnace with an agitator according to claim 1, further comprising:
a temperature sensor that measures temperature caused by the first and second magnetic field devices.

10. The melting furnace with an agitator according to claim 1, wherein a plurality of the agitators is provided.

11. The melting furnace with an agitator according to claim 1, wherein the melting furnace is made of a refractory, and the agitator is covered with a stainless case.

12. The melting furnace with an agitator according to claim 1, further comprising:
a power supply that supplies power to the first and second electrodes.

* * * * *